United States Patent Office 3,558,426
Patented Jan. 26, 1971

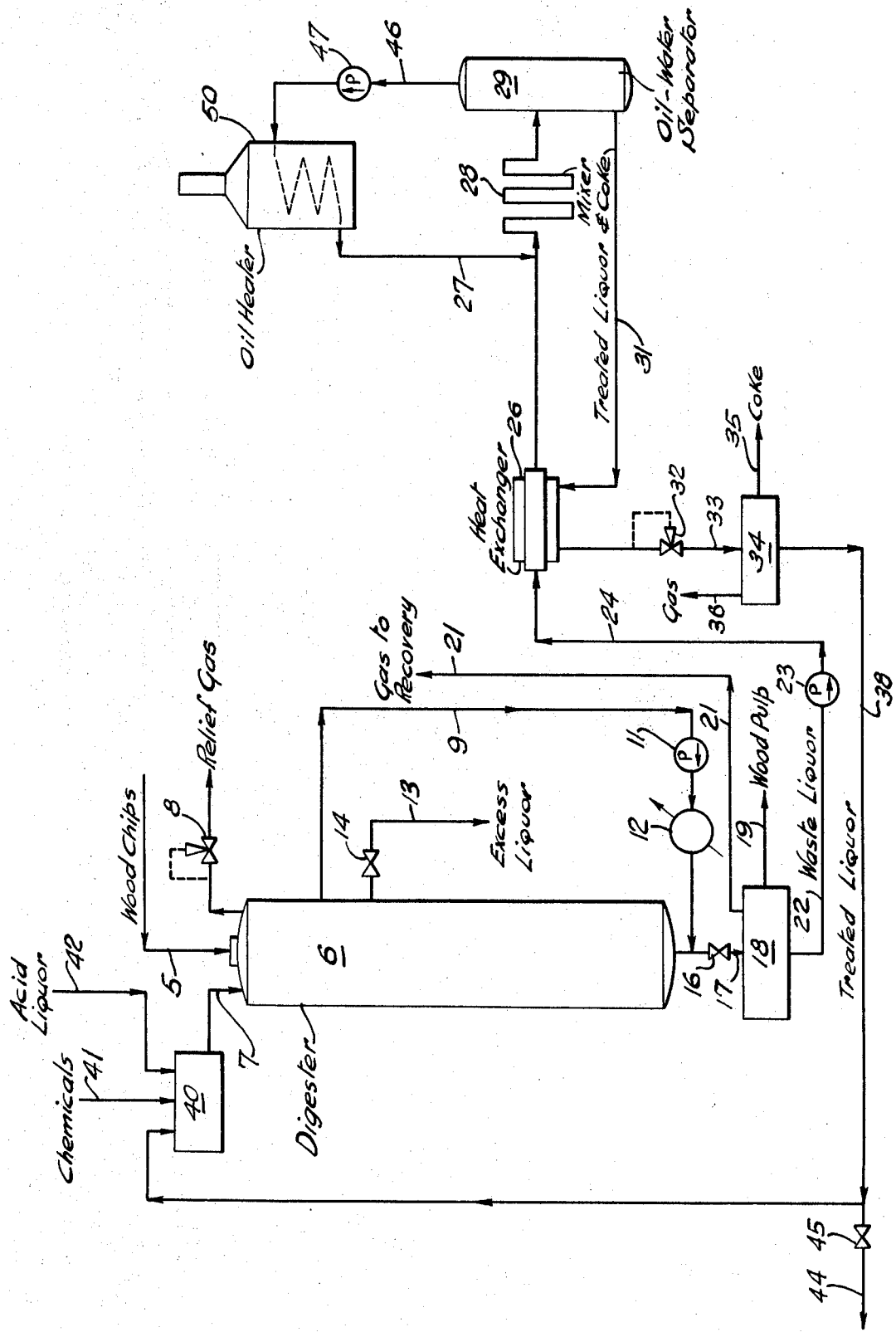

3,558,426
TREATMENT OF WASTE LIQUORS FROM PULP
AND PAPER MILLS
Howard V. Hess, Glenham, and Edward L. Cole, Fishkill,
N.Y., assignors to Texaco Inc., New York, N.Y., a
corporation of Delaware
Filed Nov. 29, 1968, Ser. No. 780,043
Int. Cl. D21c 11/00, 11/02
U.S. Cl. 162—30
9 Claims

ABSTRACT OF THE DISCLOSURE

Process for heat treatment of waste liquors from pulp and paper mills wherein waste liquor is heated by direct contact with hot hydrocarbon liquid to a temperature in the range of 400 to 700° F. under sufficient pressure to prevent vaporization of water thereby converting water soluble organic material to a water insoluble solid product, or coke, which is separated from treated aqueous liquid effluent of low chemical oxygen demand (COD) suitable for reuse in the production of cooking liquor for the pulping process or disposal in lakes or streams without significant water pollution.

---

This invention relates to the process for treatment of aqueous industrial waste from pulp and paper mills wherein waste liquor containing organic matter dissolved from the wood is heat treated to effect carbonization of said organic matter under elevated pressure in the absence of free oxygen.

The process of this invention effects removal of organic matter from aqueous pulp mill waste liquors by carbonization with heat under elevated pressure. In one of its more specific aspects, the process of this invention comprises heating aqueous organic waste liquor from pulp mills substantially in the absence of free oxygen to a temperature in the range of 400 to 700° F. and at a pressure in the range of 300 to 3,200 p.s.i.g. for a period of 0.05 to 30 minutes by direct contact with hot hydrocarbon liquid whereby water soluble organic matter in said waste liquor is converted to water insoluble solid, herein termed coke. Solid coke is removed from the treated effluent discharged from the heating zone to yield an aqueous effluent o low chemical oxygen demand (COD). The aqueous effluent may be used or the production of cooking liquor or the pulping process, or discharged as industrial waste water which may be used in the plant, e.g. as cooling water, or discharged into ponds, lakes or streams without substantial water pollution.

Various normally liquid hydrocarbons are suitable for use as the heat transfer medium in the process of the invention. Hydrocarbons and mixtures of hydrocarbons containing from 6 to 30 carbon atoms per molecule, including various petroleum fractions, e.g. gasoline, kerosene, naphtha, diesel fuel, petroleum wax, lubricating oil stocks, and paraffinic residium, may be used in the process. Examples of individual hydrocarbon types which can be used, either alone or in admixture with one another, are the aliphatic hydrocarbons, including heptanes, octanes, isooctanes, nonanes, decanes, propylene tetramer, hexadecane, 2-methyl-1-pentene, etc. Naphthenic hydrocarbons, e.g., methylcyclopentane, cyclohexane, methylcyclohexane, dimethylcyclohexane, ethylcyclohexane, tetralin, isopropylcyclohexane, cyclohexene, pinene, and the like, also are suitable but are less desirable than the aliphatic hydrocarbons for use in the process. Aromatic hydrocarbons, e.g. benzene, cumene, xylenes, methylnaphthylenes, and the like are also useful but less desirable than the aliphatic hydrocarbons in the process of the invention.

In the production of pulp and paper, wood is treated with chemicals to remove lignin binder from the cellulose fibers on the wood. In the pulping process, about one-half the dry weight of the tree processed is dissolved in the pulping liquor and only about one-half is recovered as pulp. The soluble portion of the wood, most of which is discarded as waste, presents serious disposal problems. According to recent reports in the trade literature, sulfite liquor from over 100 pulp mills in the United States and Canada is disposed of by pumping the waste liquor into the nearest river or other body of water. Legislation in many states now prohibits the discharge of sulfite waste liquor into streams, resulting in efforts by mills to find the best method of utilizing or disposing of the waste liquor.

Paper pulp is produced by three principal processes, namely, the kraft, or sulfide process, the sulfite or bisulfite process, and the soda process. The soda process uses sodium hydroxide to dissolve non-cellulose materials from the wood, while the sulfite process utilizes an acid cooking liquor described in somewhat more detail hereinafter. The kraft pulp process employs a mixture of sodium hydroxide and sodium sulfide.

Acid cooking liquor for the sulfite process is usually prepared by reaction between sulfur dioxide and limestone or dolomite in the presence of water to form calcium bisulfite $Ca(HSO_3)_2$. Instead of limestone, which forms a calcium based sulfite acid liquor, the acid cooking liquor may be prepared from ammonium carbonate, ammonium hydroxide, magnesium carbonate, magnesium hydroxide, or the carbonate, or sulfite, or hydroxide of sodium. In some systems, dolomitic lime is used in place of high-calcium lime. Dolomitic limestone, containing normally 54% $CaCO_3$ and 46% $MgCO_3$, reacts readily with sulfur dioxide to produce mixed bisulfites of calcium and magnesium.

The reactions which take place in the cooking process involve the formation of an ammonium or alkali metal salt of lignin sulfonic acid which is soluble and it is dissolved out of the wood in the cooking process. Sufficient metallic ion (or alternatively the ammonium ion) to form the salt of lignin sulfonic acid must be present in the cooking process to produce high yields of pulp.

Various methods have been devised for disposing of waste liquors from pulp and paper mills. A number of processes involve concentrating the liquor in multiple effect evaporators to increase the concentration of the solid to a value in the neighborhood of 60 weight percent. In some processes, the concentrated liquor is sprayed into a recovery furnace where it is burned to generate steam. In the kraft process, sodium sulfate and sulfur may be added to the liquor before it is fed into the recovery furnace. Chemicals recovered from the slag from the furnace, i.e. sodium sulfide and sodium carbonate, are mixed with additional chemicals, lime and sodium hydroxide, to make up white liquor for the pulping process.

Spent liquors from pulp plants also may be processed in a fluid bed system in which concentrated waste liquor is sprayed into contact with hot granular particles suspended in a moving stream of air or steam in a fluidized bed maintained at a temperature of about 1,300° F. Such disposal systems, while effective, often create problems of air pollution resulting from liberation of gaseous sulfur compounds to the atmosphere and require large capital investments.

It is an object of this invention to provide an improved method for the treatment of waste liquor from pulp and paper mills economically and to produce an effluent water which may be discharged into streams without appreciable water or air pollution.

The present invention provides a novel and improved method of treating waste liquors from wood pulping processes. In accordance with the process of this invention, waste cooking liquor from a pulping process is treated with a hot hydrocarbon liquid to effect rapid coking of water-soluble organic material contained in the waste liquor and drastic reduction in its COD.

Direct contact between waste cooking liquor and immiscible heated hydrocarbon liquid results in such rapid heat transfer that carbonization or coking of the organic material contained in the waste liquor is substantially complete in 0.05 to 10 minutes at 550 to 625° F. Co-current contacting, or mixing, is generally preferred; countercurrent contacting is also effective, however.

The process of the invention will be better understood by reference to the accompanying figure illustrating diagrammatically a preferred embodiment of the present invention as applied to the treatment of waste liquors from a pulp mill.

With reference to the figure, wood chips from a suitable source of supply, such as fir, are introduced through line 5 into digester 6 where they are cooked in cooking liquor supplied through line 7. Generally, the chips are processed at a temperature in the range of 265 to 300° F. at a pressure in the range of 70 to 90 p.s.i.g. for a period of 6 to 12 hours. In this specific example, calcium based sulfite cooking liquor, containing typically 7% by weight $SO_2$ of which 4.5% is combined as sulfurous acid and 2.5%, as calcium bisulfite, is employed in digester 6. The acid cooking liquor of the sulfite process usually contains excess or uncombined sulfur dioxide as well.

The digester 6 is a large pressure vessel suitably lined with acid proof brick or stainless steel. After a charge of wood chips amounting to several tons of wood is introduced into the digester, the cooking liquor is pumped in through line 7 while air is discharged from the upper part of the digester through a suitable relief valve 8 which also serves as a pressure limiting relief valve during the cooking process.

After the digester has been charged with the cooking liquor and wood chips, the cooking liquor is circulated through line 9 by pump 11 through heater 12 and reintroduced into the lower part of digester 6. The wood chips are gradually heated by the heated cooking liquor to a temperature of the order of 230° F., generally over a period of 1 to 2 hours, after which temperature is brought up to the desired processing temperature. During the cooking process, the level of liquor in the digester is maintained below the top of the vessel by withdrawing some of the cooking liquor through line 13 as controlled by valve 14.

At the end of the cooking period, the contents of digester 6 are discharged through valve 16 and line 17 to blow pit 18 where wood pulp is separated from resulting waste liquor. The pulp is dicharged through line 19 for further processing. Prior to discharge of the pulp from the digester to the blow pit, the pressure in the digester is usually reduced to approximately 25 pounds per square inch gauge by withdrawal of gas and steam through valve 8. After the pressure in the digester has been reduced blow valve 16 at the bottom of the digester is opened to permit the contents to discharge into blow pit 18. Steam and gas released from the pulp during the blowing process are discharged through line 21 to a recovery system, not shown, in which steam is condensed and sulfur dioxide is dissolved in the water and recovered for use in making up cooking liquor. Gas released from the relief valve 8 at the top of the digester during the cooking process and during the depressuring operation are also treated for recovery of sulfur dioxide and returned to the system with the acid cooking liquor.

It is to be understood that the process for cooking and digesting the wood chips and the process for separating wood pulp from the waste liquor and recovery of waste gases from the digester and blow pit effluents form no part of the present invention but are intended merely as representative of conventional commercial operations. In general, throughout this specification, the process conditions and compositions mentioned are those typical of a calcium based sulfite pulping process. This detailed description illustrates a preferred embodiment of the process of this invention as applied to the treatment of waste liquor from such processes. It is to be understood, however, that the process of this invention may be applied to the treatment of waste liquors from any of the various pulping processes with equal effectiveness.

According to the present invention, waste liquor is drawn from blow pit 18 through line 22 and passed by pump 23 through line 24 to a coking system for removal of dissolved organic materials from the liquor as described more fully hereinafter. In this specific example, the waste liquor is passed from line 24 through a heat exchanger 26 where the waste liquor is preheated by heat exchange with hot recycle liquor from a source described hereinafter. The preheated waste liquor from heat exchange with hot recycle liquor from a source described carbon liquid from line 27. To insure intimate mixing and adequate residence or contact time between the hot hydrocarbon liquid and have waste liquor, a suitable mixer 28 is provided. In this example, the mixer 28 consists simply of a flow line mixer comprising a plurality of tubes or pipes connected in a serpentine manner, preferably using pipe elbows or other sharp turns to enhance turbulence. The resulting mixture of hydrocarbon liquid and heated waste liquor is discharged into oil-water separator 29.

The contact time between the hot hydrocarbon liquid and the waste liquor is of the order of 0.1 to 5 minutes. The temperature and volume of the hydrocarbon liquid introduced from line 27 is such that the temperature of the resulting mixture is within the range of 500 to 600° F. In general, it is desirable to employ about equal volumes of hydrocarbon liquid and waste liquor although the amount of hydrocarbon liquid may range from 0.5 to 2 volumes per volume of waste liquor.

On combining the hydrocarbon oil and the waste liquor, coking of organic compounds contained in the waste liquor takes place. During the coking process, combined oxygen in the sugars, acids, and other organic oxygen compounds contained in the waste liquor is liberated as carbon dioxide and water by decarboxylation and dehydroxylation resulting in the formation of water-insoluble solid material or coke. The mixture of aqueous waste liquor and hydrocarbon liquid discharged from mixer 28 contains carbonized solid particles or coke.

In oil-water separator 29, the treated aqueous waste liquor containing the particles of coke produced in the process is separated from a hydrocarbon liquid or oil phase. Treated liquor containing coke formed in the process is withdrawn from the lower part of oil-water separator 29 through line 31 to heat exchanger 26 where heat from the hot treated liquor is utilized to preheat the waste liquor from line 24. From heat exchanger 26, the dispersion of coke in treated liquor is passed through reducing valve 32 and line 33 to solid separator 34 where coke is removed from the treated liquor, suitably by filtration. Solid material or coke separated from the treated liquor is discharged from separator 34 through line 35. Gas released during the coking process is discharged from separator 34 through line 36 and processed for recovery of chemicals. Treated liquor is withdrawn from separator 34 through line 38 and passed by pump 39 to tank 40 where it is utilized in the makeup of cooking liquor for the process. Control valve 32 in line 33 reduces the pressure from the relatively high pressure of the waste liquor treating process to the relatively low pressure of the digester 6, e.g. from about 1000 p.s.i.g. to about 100 p.s.i.g.

Suitable chemicals for the production of cooking liquor may be added to tank 40 through line 41. Fresh or recovered acid may be supplied to tank 40 through line 42. The particular makeup of the cooking liquor or the composition or formula utilized for the production of cooking liquor from the treated waste liquor is not a part of the present invention. It will be appreciated that the treated liquor, though depleted of soluble organic material, such as sugars, starches, lignosulfonates, and the like, still contains inorganic chemicals. It is to be understood also that, if desired, treated liquor of relatively low COD may by discharged from the system, e.g. through line 44 as controlled by valve 45.

Hydrocarbon liquid separated from the treated waste liquor and coke in separator 29 is withdrawn from the upper part of the separator through line 46 by pump 48 and passed to oil heater 50 where the temperature of the hydrocarbon liquid is raised to the desired temperature for reintroduction through line 27 into waste liquor in mixer 28.

The following examples further illustrate the process of this invention for the treatment of waste liquors from pulp making processes.

EXAMPLES 1 AND 2

Waste liquors obtained from an ammonia based sulfite pulp plant (Example 1) and from a kraft process plant (Example 2) were each subjected to heat treatment with equal parts by weight of n-decane for one hour at a mixture temperature of 550° F. Coke formed in the process was recovered from the aqueous phase by filtration.

|  | Example 1 | | Example 2 | |
| --- | --- | --- | --- | --- |
|  | Feed | Water phase | Feed | Water phase |
| Type feed | Sulfite |  | Kraft |  |
| COD, g./l. | 153.5 | 11.3 | 167.0 | 57.4 |
| Sulfur, wt. percent |  | 0.11 | 0.29 | 0.38 |
| Residue on evap., g./l. | 114.3 |  | 172 |  |
| Dry coke: |  | Solid |  | Solid |
| Wt. percent of charge |  | 5.1 |  | 3.67 |
| Sulfur, wt. percent |  | 6.38 |  | 1.19 |
| Carbon, wt. percent |  | 59.4 |  | 77.7 |
| Nitrogen, wt. percent |  | 2.6 |  |  |
| Ash, wt. percent |  | 4.5 |  | 17.5 |

Properties of the n-decane charge and the recovered oil phase are shown in the following table:

|  | n-Decane charge | Example 1, oil phase | Example 2 oil phase |
| --- | --- | --- | --- |
| Gravity, °API | 61.0 | 60.7 | 60.9 |
| Aniline point, °F. | 169.9 | 169.5 | 169.5 |
| Sulfur, wt. percent | <0.005 | 0.023 |  |
| ASTM distillation, °F.: |  |  |  |
| IBP | 336 | 334 | 328 |
| 5 | 336 | 336 | 334 |
| 10 | 336 | 337 | 336 |
| 50 | 336 | 337 | 340 |
| 90 | 336 | 337 | 341 |
| 95 | 336 | 337 | 345 |
| EP | 343 | 350 | 367 |
| Residue, wt. percent | 1.2 | 1.3 | 1.0 |

EXAMPLE 3

Waste liquor from a kraft pulp process as in Example 1, was subjected to heat treatment with equal parts by weight of kerosene for one hour at an equilibrium temperature for the mixture of 550° F. with the following results.

|  | Feed | Water phase |
| --- | --- | --- |
| COD, g./l. | 153.5 | 48.9 |
| Sulfur, wt. percent |  | 0.38 |
| pH |  | 9 |
| Residue on evap., g./l. | 172 |  |
| Dry coke: |  |  |
| Wt. percent of charge |  | 3.78 |
| Carbon, wt. percent |  | 62.4 |
| Ash, wt. percent |  | 16.3 |

Properties of the kerosene charged and the recovered oil phase are shown in the following tabulation.

|  | Charge, kerosene | Oil phase |
| --- | --- | --- |
| Gravity, °API | 43.7 | 44.4 |
| Aniline point, °F | 143.9 | 137.1 |
| Distillation, ASTM: |  |  |
| IBP | 321 | 563 |
| 5 | 344 | 328 |
| 10 | 350 | 363 |
| 20 | 359 | 372 |
| 30 | 370 | 384 |
| 40 | 380 | 395 |
| 50 | 390 | 140 |
| 60 | 403 | 420 |
| 70 | 417 | 435 |
| 80 | 433 | 410 |
| 90 | 455 | 451 |
| 95 | 475 | 488 |
| EP | 490 | 506 |
| Recovery | 98.0 | 97.5 |
| Loss | 0.5 | 1.0 |
| Residue | 1.5 | 1.5 |

EXAMPLE 4

Spent sulfite liquor from an ammonia based sulfite process paper pulp plant is processed in accordance with this invention at the average rate of 100,000 pounds per hour. Dissolved organic matter is substantially removed from the waste liquor by coking the spent liquor in the presence of a high quality paraffinic kerosene. The tests on the charge spent sulfite liquor and the kerosene used are shown below:

Kerosene

| Gravity, °API | 41.9 |
| --- | --- |
| Color, Saybolt | 25+ |
| Sulfur, wt. percent | 0.05 |
| Flash-Tag °F. | 138 |
| Smoke point | +30 |
| ASTM Distillation: |  |
| IBP, °F. | 336 |
| 10% | 355 |
| 95% | 465 |
| EP | 514 |

Spent sulfite liquor

| Viscosity, kinematic at 100° F. cs. | 0.967 |
| --- | --- |
| Gravity, °API | 3.7 |
| COD, g./l. | 153.5 |
| Residue on evaporation, g./l. | 114.25 |
| Total volatile, g./l. | 112.086 |
| Fixed residue, g./l. | 2.164 |
| Carbon, wt. percent | 5.0 |
| Nitrogen, wt. percent | 0.32 |
| Sulfur, wt. percent | 0.34 |

The spent sulfite liquor at the rate of 100,000 pounds per hour is rapidly preheated to about 475° F. under turbulent flow conditions and the heated liquor intimately mixed with paraffinic kerosene heated to 705° F. and supplied at the rate of 160,000 pounds per hour. The system is maintained at a pressure of 1300 p.s.i.g. The heated kerosene and spent sulfite liquor are mixed with one another in each of two, six-inch (5.189" ID) tubes or pipes, each 30 feet long. The flow is regulated about one-half of the hot kerosene and about one-half of the preheated spent liquor is passed through each tube. In flowing through the tubes under turbulent flow conditions, the spent liquor and the hot kerosene are intimately contacted and the sulfite liquor is heated whereby coking of the organic matter is effected. The mixture attains a temperature of about 575° F. during the 5½ seconds contact time in the tubes. The fluids from the two six-inch tubes pass to a settler wherein substantially complete separations of the two immiscible liquid phases, an aqueous phase and an oil phase, occurs. Gas produced in the process is drawn from the top of the separator. The oil phase is withdrawn from the separator and recycled to the process. The lower liquid, or water phase, containing the coke is removed, cooled to about 400° F. and centrifuged. Liquid recovered from the centrifuge is recycled and refortified for use as the sulfite pulping liquor. The coke is dried and burned for recovery of heat and $SO_2$.

Typical one hour test results are shown in the following tabulations.

Product: Weight, lbs.
- Gas _____ 785
- Dry coke _____ 5060
- Water phase _____ 93,950

Product tests

Gas analysis: Mol percent
- Dimethyl sulfide _____ 0.1
- Methyl mercaptan _____ 1.5
- $CO_2$ _____ 96.3
- Hydrogen _____ 1.5
- Methane _____ 0.4
- Ethane _____ 0.2

Dry coke:
- Carbon, wt. percent—61.9
- Sulfur wt. percent—6.2
- Nitrogen, wt. percent—3.1
- Ash, wt. percent—5.2
- Gross heat of combustion B.t.u./lb.—10,980

Treated waste liquid
- COD, g./l.—12.72
- Residue on evaporation g./l.—14.72
- Total volatile, g./l.—13.05
- Fixed residue, g./l.—1.67
- Nitrogen, wt. percent—0.16
- Sulfur, wt. percent—0.1

EXAMPLE 5

Ammonia based sulfite liquor is produced at an average rate of 52,000 pounds per hour. The organic matter is substantially removed from the waste liquor by coking the spent liquor in the presence of a paraffinic petroleum distillate. The tests on the spent sulfite liquor and the petroleum distillate are as follows:

Petroleum distillate
- Gravity, °API—44.4
- Sulfur, wt. percent—0.01
- Flash-Tag, ° F.—140
- Aniline point, ° F.—158
- ASTM distillation:
  - IBP, ° F.—330
  - 10%—336
  - 50%—340
  - 95%—400
  - EP—450

Spent sulfite liquor
- COD, g./l.—207
- Dissolved solids, wt. percent—13.5
- Density, 20° C.—1.05
- Carbon, wt. percent—7.5
- Sulfur, wt. percent—0.76
- Nitrogen, wt. percent—0.32

Waste sulfite liquor, following removal of pulp, is at a temperature of about 200° F. This liquor, produced at a rate of 52,000 pounds per hour, is immediately injected into a 10 inch, Schedule 160, pipe 35 feet long, together with 222,000 pounds per hour of petroleum distillate that has been preheated to 710° F. About 1075 p.s.i.g. is maintained on the system so that the operation is in substantially the liquid phase. The flow is turbulent ($N_{Re} = 20 \times 10^5$) and the total contact time is about 7.5 seconds. Under those conditions, the sulfite liquor phase is heated to 545° F. whereby substantial coking of the organic materials occurs and gel formation is minimized. The fluids from the reactor tube pass to a settler where a substantial separation of the two immiscible liquid phases occurs together with a small amount of gas phase. The bottom water phase containing the coked organic matter is cooled to about 300° F. by heat exchange and filtered.

A coke free liquid and a wet coke are obtained. The liquid is recycled for reuse after fortification as a pulping liquid and the coke is burned for recovery of sulfur dioxide. The hydrocarbon phase is recycled to the heater for reuse in the process.

Typical average results are tabulated below:

Pound/hour
- Spent liquor charge _____ 51,700
- Gas make _____ 310
- Water phase (filtered) _____ 43,100
- Dry coke [1] _____ 4500

[1] Wet coke has a water content of 35 wt. percent.

Product tests

Gas analysis: Mol percent
- Methyl mercaptan _____ 1.3
- Carbon dioxide _____ 97.0
- Hydrogen _____ 1.0
- Hydrocarbons _____ 0.7

Dry coke
- Carbon wt. percent—63.7
- Sulfur wt. percent—6.1
- Nitrogen, wt. percent—3.2
- Gross heat of combustion, B.t.u./lb.—11,000

Treated liquor phase
- COD, g./l.—17.8
- Nitrogen, wt. percent—0.2
- Sulfur, wt. percent—0.3

We claim:

1. A process for treatment of waste liquors from pulp and paper mills wherein waste liquor containing organic matter dissolved from wood is heat treated by passing said liquor through a coking zone wherein said liquor is heated to an elevated temperature in the range of 500 to 700° F. under a pressure above the vapor pressure of water by direct contact with hot hydrocarbon liquid in said coking zone effecting carbonization of said organic matter to coke, separating the treated liquor containing coke particles from said hydrocarbon liquid and separating said coke particles from the treated liquor.

2. A process according to claim 1 wherein said waste liquor and said hot hydrocarbon liquid are passed through said coking zone in cocurrent flow.

3. A process according to claim 1 wherein said hydrocarbon liquid is preheated to a temperature within the range of 600 to 700° F. prior to contact with waste liquid.

4. A process according to claim 1 wherein the pressure in said coking zone is within the range 950 to 3,000 p.s.i.g.

5. A process according to claim 1 wherein the average residence time of said liquor in said coking zone at a temperature above 500° F. is within the range of 0.5 to 10 minutes.

6. A process according to claim 1 wherein said recovered liquor is reused in the production of cooking liquor for the pulping process.

7. A process according to claim 1 wherein said waste liquor is black liquor from kraft pulping process.

8. A process according to claim 1 wherein said waste liquor is a sulfite pulping process waste liquor.

9. A process according to claim 1 wherein said waste liquor is derived from the soda process for pulp production.

References Cited

UNITED STATES PATENTS

| | | | |
|---|---|---|---|
| 1,905,686 | 4/1933 | Cole | 23—209.1X |
| 2,966,396 | 12/1960 | Eaton | 23—209.4X |
| 3,037,901 | 6/1962 | Thomsen | 162—32X |
| 3,507,788 | 4/1970 | Cole et al. | 210—63 |

EDWARD J. MEROS, Primary Examiner

U.S. Cl. X.R.

23—209.1, 209.4; 201—10, 25; 162—36, 38; 210—56